(12) United States Patent
Darty et al.

(10) Patent No.: US 8,408,077 B2
(45) Date of Patent: Apr. 2, 2013

(54) METHOD AND APPARATUS FOR SENSING APPLIED FORCES

(75) Inventors: Mark Anthony Darty, Collierville, TN (US); Mohamadinejad Habib, Bartlett, TN (US)

(73) Assignee: Brother International Corporation, Bridgewater, NJ (US)

( * ) Notice: Subject to any disclaimer, the term of this patent is extended or adjusted under 35 U.S.C. 154(b) by 1749 days.

(21) Appl. No.: 10/553,892

(22) PCT Filed: Sep. 22, 2003

(86) PCT No.: PCT/US03/12536
§ 371 (c)(1),
(2), (4) Date: Dec. 26, 2006

(87) PCT Pub. No.: WO2005/038468
PCT Pub. Date: Apr. 28, 2005

(65) Prior Publication Data
US 2011/0094315 A1      Apr. 28, 2011

(51) Int. Cl.
*G01L 1/00* (2006.01)
(52) U.S. Cl. .................... 73/862.68; 73/862
(58) Field of Classification Search ............ 73/862, 73/862.68
See application file for complete search history.

(56) References Cited

U.S. PATENT DOCUMENTS

| | | | | |
|---|---|---|---|---|
| 6,097,138 | A * | 8/2000 | Nakamoto | 313/309 |
| 6,132,278 | A * | 10/2000 | Kang et al. | 445/14 |
| 6,212,939 | B1 * | 4/2001 | Thundat | 73/24.02 |
| 6,445,006 | B1 * | 9/2002 | Brandes et al. | 257/76 |
| 6,645,028 | B1 * | 11/2003 | Dean et al. | 445/6 |
| 6,692,324 | B2 * | 2/2004 | Simpson et al. | 445/24 |
| 7,002,609 | B2 * | 2/2006 | Lewis | 347/129 |
| 2002/0024279 | A1 * | 2/2002 | Simpson et al. | 313/309 |
| 2004/0091285 | A1 * | 5/2004 | Lewis | 399/168 |
| 2005/0067936 | A1 * | 3/2005 | Lee et al. | 313/309 |
| 2011/0094315 | A1 * | 4/2011 | Darty et al. | 73/862.68 |

FOREIGN PATENT DOCUMENTS

| WO | WO 01/77694 | 10/2001 |
|---|---|---|
| WO | WO 2004052773 A2 * | 6/2004 |
| WO | WO 2005038468 A1 * | 4/2005 |

OTHER PUBLICATIONS

XP-000930011: Science, vol. 283, Jan. 22, 1999, pp. 512-514, Article: Self-Oriented Regular Arrays of Carbon Nanotubes and their Field Emmission Properties Fan, et al.

* cited by examiner

*Primary Examiner* — Lisa Caputo
*Assistant Examiner* — Jamel Williams
(74) *Attorney, Agent, or Firm* — Frommer Lawrence & Haug LLP (57) ABSTRACT

An apparatus for sensing a force. The apparatus includes a nanostructure being suitable for emitting electrons and a collector. The collector is proximately positioned with respect to the nanostructure so as to receive the emitted electrons and define a gap therebetween. The gap is partially dependent upon the applied force and the emission and reception of the electrons are indicative of the applied force.

72 Claims, 7 Drawing Sheets

METHOD AND APPARATUS FOR SENSING APPLIED FORCES

FIELD OF THE INVENTION

The present invention relates to force sensors and, more particularly, force sensors such as accelerometers and pressure sensors.

BACKGROUND OF THE INVENTION

A significant amount of work and effort has been used to develop force sensing transducers or accelerometers. Generally, an accelerometer is a device for measuring acceleration, or the rate of change of velocity. Traditionally, accelerometer functionality has been achieved by sensing forces due to gravity or acceleration by using proof mass devices located on structures, such as beams or diaphragms, which vibrate or are displaced when a force acts on the proof mass. Measurement of the amplitude and frequency of resulting vibrations is traditionally performed using one of a number of transducer methods including capacitive, magnetic, piezoelectric, optical, or photo-thermal. Accelerometers have been fabricated using silicon micro-electromechanical systems (MEMS) technology.

However, in certain applications it may be desirable to increase the sensitivity and range of measurement that may be achieved by an accelerometer.

SUMMARY OF THE INVENTION

In accordance with an aspect of the invention, an apparatus for sensing at least one force applied to the apparatus is disclosed where the apparatus includes: at least one nanostructure being suitable for emitting electrons; and, at least one collector proximately positioned with respect to the at least one nanostructure so as to receive the emitted electrons and define at least one gap therebetween that is at least partially dependent upon the applied force; wherein, the emission and reception of the electrons is indicative of the applied force.

In accordance with an aspect of the invention, a method for sensing at least one applied force, the method including: receiving emissions from at least one nanostructure using at least one collector proximately positioned with respect to the at least one nanostructure; and, sensing at least one current associated with the at least one collector; wherein, the sensed current is indicative of the applied force.

In accordance with an aspect of the invention, an accelerometer including: at least one nanostructure being suitable for emitting electrons in response to application of at least one potential; and, a collector positioned with respect to the at least one nanostructure to sense the emitted electrons upon application of the potential; wherein, the at least one nanostructure is sufficiently and at least partially displaceable with respect to the collector such that displacement of the at least one nanostructure with respect to the collector is indicative of at least one acceleration.

In accordance with an aspect of the invention, a field emission based sensing device is disclosed which includes: a plurality of nanostructures; and, at least one sensor proximately positioned with respect to the nanostructures and being suitable for detecting field emissions from the nanostructures based upon application of a bias across the sensor and nanostructures and at least partial displacement of the nanostructures with respect to the sensor.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts.

DETAILED DESCRIPTION OF THE PREFERRED EMBODIMENTS

Figure 1:
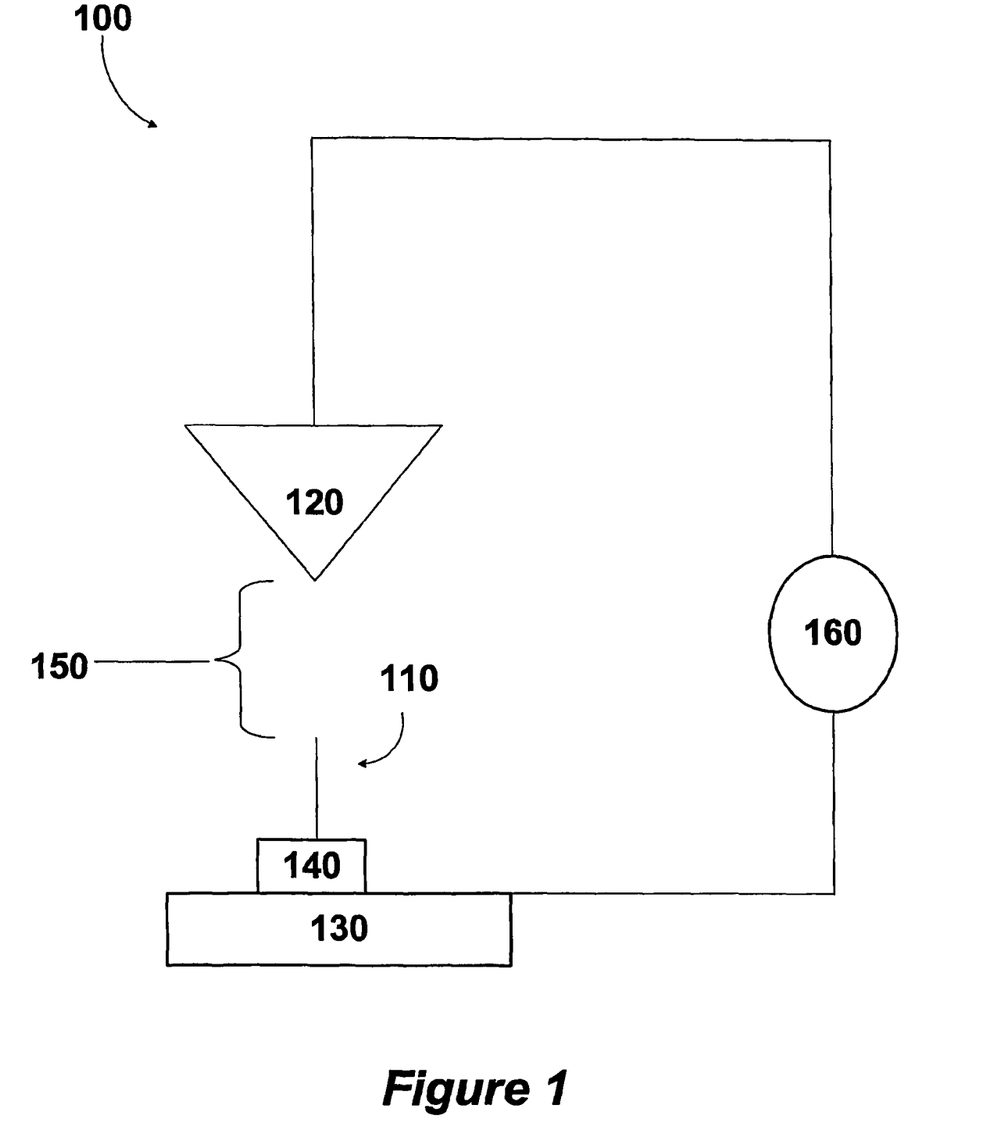
FIG. 1 illustrates a block diagrammatic representation of an apparatus according to an aspect of the present invention.

Referring now to FIG. 1, there is shown an apparatus 100 for sensing acceleration forces developed in accordance with the present invention. As may been seen in FIG. 1, apparatus 100 generally includes an emitter 110 supported by a substrate 130, and collector 120. Collector 120 may be positioned with respect to emitter 110 such that upon excitation of emitter 110, emitted electrons may be sensed by collector 120. Collector 120 may be located near an end of emitter 110 distal to substrate 130 with the distance between the collector 120 and emitter 110 defining a gap 150. An electrical potential 160 may exist between collector 120 and emitter 110, creating a bias therebetween. For example an excitation pad 140 may be electrically coupled to emitter 110, such as by being fixedly interposed between emitter 110 and substrate 130.

Substrate 130 may include electrical interconnects and circuit components in addition to providing a surface supporting, such as on which to grow, emitters 110. Substrate 130 may be fabricated using micro or nano lithography processes known to those possessing an ordinary skill in the pertinent arts. Substrate 130 may take the form of any suitable substrate, such as a Si wafer for example. Pad 140 may be composed largely of any conducting material suitable for providing electrical connectivity for emitter 110, such as copper or gold for example.

Collector 120 may be positioned near to, but not contacting, the free end of emitter 110, such that collector 120 may receive electron field emission of emitter 110. Collector 120 may be designed to collect electron flux emanating from emitter 110, such as by using an electrical current sensor in a signal path between collector 120 and a power supply providing potential 160, for example. Collector 120 may detect the electron field emission in several other ways including heat or spectral re-emission of energy according to different wavelengths depending on the energy of the electrons impacting collector 120 and collector substance. Collector 120 may take the form of any conventional collector for determining when electrons emitted from emitter 110 arrive.

Collector 120 and the free end of emitter 110 may define a gap 150 that varies dependently upon a force exerted on emitter 110 and/or collector 120.

A power supply may provide potential 160 and may be connected between emitter 110 and collector 120 such that a potential difference is created across gap 150. Voltage 160 may cause an electric field to form between emitter 110 and collector 120. Emitter 110 may emit an electron field at potential differences above approximately 1.5 V/μm, for example. Potential difference 160 between emitter 110 and collector 120 may be calculated by dividing the applied voltage by gap 150, for example.

Emitter 110 may take the form of one or more carbon nanostructures being capable of emitting electrons upon excitation thereof. Such nanostructures may be suitable for emitting electrons towards collector 120 responsively to application of potential 120 to pad 140 and collector 120. One or more nanostructures 110, such as carbon-based nanotubes (CNTs), may be formed, deposited or otherwise operatively coupled to substrate 130. Carbon nanotubes are a variant of crystalline carbon, and are structurally related to cagelike, hollow molecules composed of hexagonal and pentagonal groups of carbon atoms, or carbon fullerene "buckyballs", or $C_{60}$. Such CNTs may take the form of single-wall carbon nanotubes having diameters of 1.2 to 1.4 nm, for example, with lengths of approximately 10 μm, for example.

Emitter 110 may take the form of that nanotubes having both ends attached to a substrate. Such a configuration is disclosed in U.S. Patent Publication 2003/0036332A1, the entire disclosure of which is hereby incorporated by reference herein. By biasing such a configuration with a voltage, an electron field may be emitted roughly orthogonal to the long axis of the nanotube, thereby emitting electrons vertically in the cavity shown.

It should be understood however, that any nanostructure, or group of nanostructures (being either homogenous or heterogeneous in nature), such as multi-wall carbon nanotubes or arrays of single- and multi-wall carbon nanotubes, being suitable for emitting electrons so as to collide with collector 120 may be used.

Such CNTs may take the form of one or more films containing carbon nanotubes, including single-wall carbon nanotubes for example. The manufacture of such films is understood by those possessing an ordinary skill in the pertinent arts. For example, such a film may be produced in accordance with the teachings of Jean-Marc Bonard et. al. in "Field Emission From Single-Wall Carbon Nanotube Films". Applied Physics Letters, vol. 73, No. 7, Aug. 17, 1998. Briefly, Bonard et. al. teach that single-wall carbon nanotubes may be produced using arc discharge under a 500 mbar static pressure, and a graphite cathode (20 mm) and anode (5 mm). A 3 mm aperture through the anode may be filled with a graphite-Ni—Y mixture having a weight proportion of 2:1:1. A voltage of 25 V (100 A) may then be applied, producing webs of nanotubes. These webs may be sonicated in a sodium dodecyl sulfate at 2 critical micellular concentration. The resulting suspension may then be drawn through a 0.2 μm pore ceramic filter to produce a film, that may be transferred to a Teflon coated copper or brass plate. This plate/film composite structure may be utilized as nanostructures 130 and substrate 130.

Such CNTs may take the form of one or more self-oriented regular arrays of carbon nanotubes. The production of such arrays is well understood in the pertinent arts. For example, such an array may be formed in accordance with the teachings of Shoushan Fan et al. in "Self-Oriented Regular Arrays of Carbon Nanotubes and Their Field Emission Properties". Science, pp. 512-514, Vol. 283, Jan. 22, 1999. Briefly, Fan et al. teach that a P-doped, N+-type Si(100) wafer may be electrochemically etched using one part (50% aqueous solution) hydrogen fluoride and one part ethanol at 10 mA/cm2 and a Pt cathode to form a porous silicon substrate. This substrate may be patterned using Fe films and electron beam evaporation through shadow masks. The patterned substrate may then be annealed at 300° C., so as to oxidize the surface of the exposed silicon and iron. The annealed substrate may then be heated to 700° C. in Ar. Ethylene flown at 1000 sccm for 15 to 60 min., forming three dimensional arrays of nanotubes corresponding to the patterned portions of the substrate. This pattern/substrate composite may be used as emitter 110 and substrate 130.

Emitter 110 may be electrically coupled to excitation pad 140 located on substrate 130. One end of emitter 110 may be mechanically affixed to substrate 130 and electrically coupled to excitation pad 140, while the other end is free to move, thereby creating a cantilevered emitter. A potential suitable for exciting emitter 110 may be necessary to achieve electron field emission. When a force acts on emitter 110, the free end distal to substrate 130 may be correspondingly displaced from rest by a distance. Emitter 110 may act as a proof mass or a secondary proof mass may be affixed to emitter 110 to increase its mass, and therefore its sensitivity to smaller forces as will be readily understood by those possessing an ordinary skill in the pertinent arts. Such additional proof mass increase may be accomplished by molecular absorption of substances to emitter 110, for example, using elements such as hydrogen.

Figure 2:
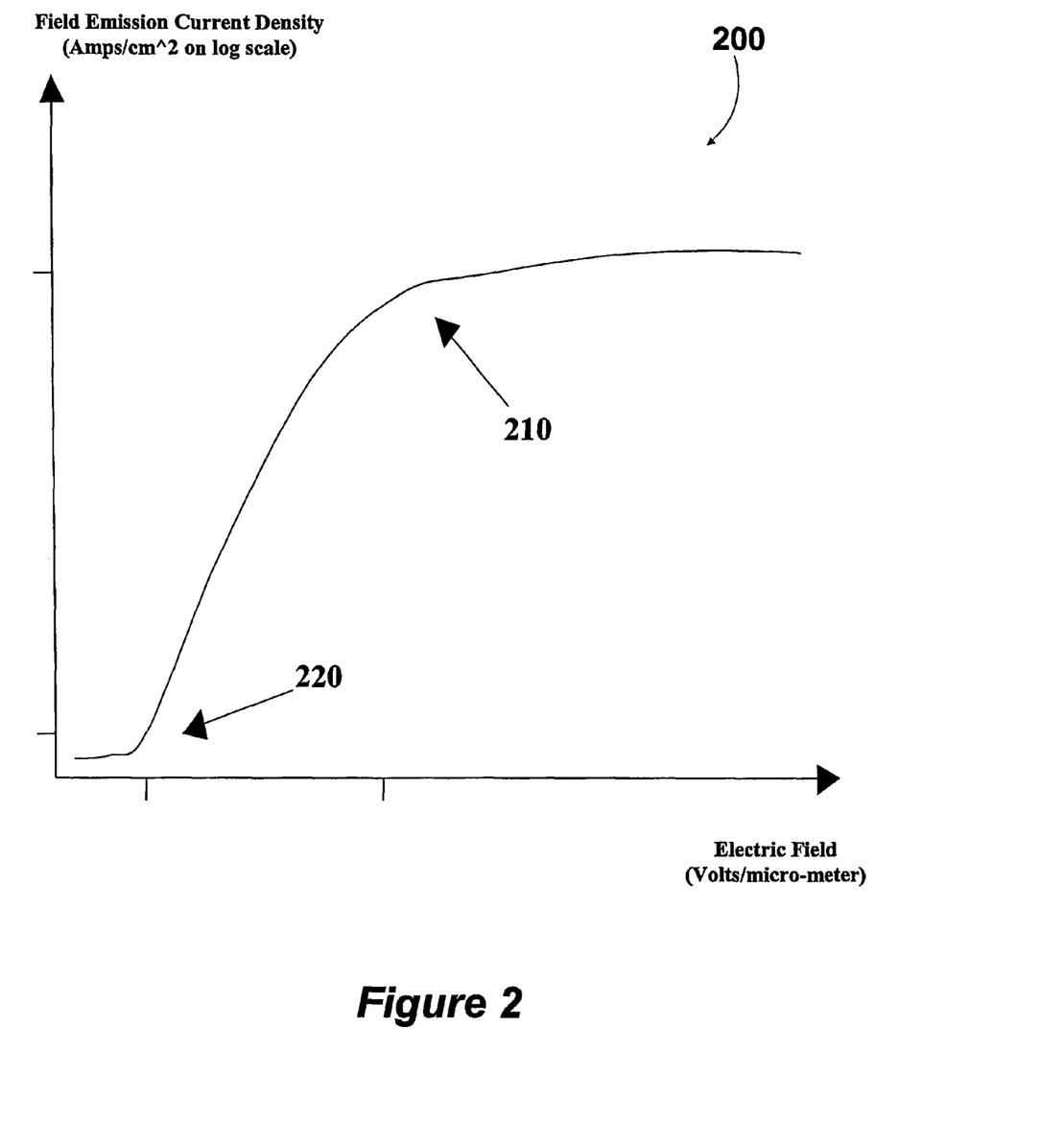
FIG. 2 illustrates a logarithmic plot of a typical relationship between field emission and electric field according to an aspect of the present invention.

According to an aspect of the present invention, by way of non-limiting example only, and referring now also to FIG. 2, a typical field emission plot for a suitable emitter 110, such as CNTs, is shown. Field strength below about 1.5 volts/μm may cause emission to cut off 220 and drop to near zero. A field strength of a few volts/μm or greater may cause the emission to substantially saturate 210. In between cut off 220 and saturation 210 there is a transition region for emission being suitable for operation of emitter 110. Potential 160 may be within such a region.

Gap 150 may be configured such that when the system is at rest, with no external forces, there is substantially no field emission. This configuration may cause emitters 110 to operate in the cutoff region, as shown in FIG. 2. If a constant, or substantially constant, voltage 160 is applied across emitter 110 and collector 120, and apparatus 100 experiences a force that causes either emitter 110 or collector 120 or both to move, thereby effecting gap 150, the electric field potential may also be effected, thereby effecting the electron field emission from emitter 110. Detecting changes in field emission may be accomplished in many ways known to those skilled in the pertinent arts, such as by capacitive measurement, spectral observation of photon emissions from the collector 120 or electrical current measurements, to detect increased current flow in the voltage supply return circuit connected to collector 120. A changed field emission may be manifested at the collector 120 by a correspondingly changed electrical charge on the collector 120 and by correspondingly changed current passing between the collector 120 and the voltage supply return circuit. By knowing the mechanical characteristics of the system, such as the proof mass and displacement due to force acting on the system, one can relate displacement between emitter and collector to the force acting on the system. The amount of electrical current measured is related to both the bias voltage and distance separating the emitter and collector. By holding the bias voltage constant the amount of electrical current measured between the collector and the voltage supply can be related to the force acting on the system. Measurement of electron current is known to those possessing an ordinary skill in the pertinent arts.

While the apparatus disclosed herein might be operated in a multitude of environments, certain environments may increase the lifetime of the emitters, such as for example if the apparatus is enclosed in a vacuum environment or chamber.

Applied force may be calculated, given a fixed voltage potential applied from emitter 110 to collector 120 and a known current, by determining gap 150 by solving an equation depicting the characteristic emission response curve (as shown in FIG. 2) or other suitable means for solving equations known to those skilled in the pertinent arts. After gap 150 is determined, the applied force may be determined by solving equations relating beam displacement to force applied for a fixed proof mass. If this technique is applied to fluid or gas pressure measurement, a flexible membrane may be used. After determining gap 150, the pressure causing the flexible membrane to deform and move the collector 120 closer to the electrode may be determined by solving equations relating the membrane displacement to the fluid or gas pressure. These measurements may be made as a function of time, thereby measuring vibrational frequency. Applied force may also be calculated based on time and/or frequency.

Figure 3:
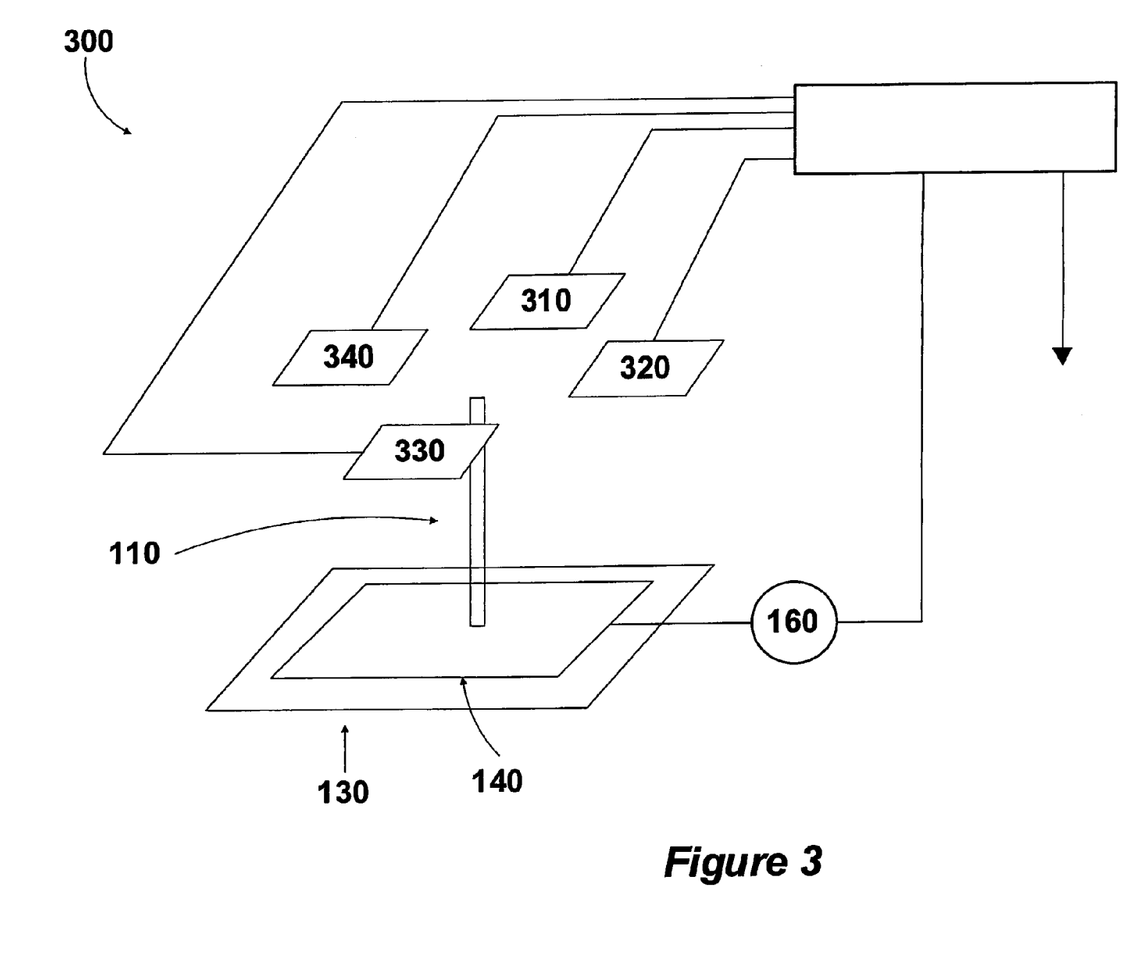
FIG. 3 illustrates a block diagrammatic representation of an apparatus according to an aspect of the present invention.

Referring now to FIG. 3, there is shown an apparatus 300 according to an aspect of the present invention. Apparatus 300 includes emitter 110, substrate 130, excitation collector 140, potential 160, a plurality of collectors, which are illustrated in a non-limiting manner to include a first collector 310, second collector 320, third collector 330 and fourth collector 340. As is also shown in FIG. 3, apparatus 300 may be configured with a first end of emitter 110 electrically coupled to excitation collector 140 and mechanically coupled to substrate 130, while a second, distal end of emitter 110 is free to move. Positioned in the vicinity of this free end of emitter 110 may be the plurality of collectors, shown in FIG. 3 as collector one 310, collector two 320, collector three 330, and collector four 340. The free tip of emitter 110 may be located at any suitable height with respect to the plurality of collectors and need not necessarily be located in the same plane as defined by plurality of collectors. Indeed, the plurality of collectors need not even define a common plane. According to an aspect of the present invention, each of the plurality of collectors may be located equidistant from the tip of emitter 110. The plurality of collectors may be any known distance from the tip of emitter 110 since this may take the form of a variable in a positioning determining algorithm that may be used. Such an algorithm may be set up so as to be solved on the basis of measured current, or take the form of a lookup table based upon calibration or testing data, by way of non-limiting example only. As shown in FIG. 3, as the plurality of collectors incorporates four distinct collectors 310, 320, 330, 340, a capability to detect movement of emitter in two-dimensions is provided. It should be understood however, that any suitable number of collectors may be used as opposed to strictly the illustrated four, depending upon the number of axis's to be measured and any desired redundancy, for example. For example, if the plurality of collectors incorporates one collector as discussed hereinabove, force may be detected in a single-axis. Using two collectors 90 degrees apart around the tip of emitter 110 may allow detection in two-axis. Increasing the number of collectors surrounding tip of emitter 110 may allow increased accuracy of tip location in two axes. FIG. 2 depicts one exemplary and non-limiting use of four collectors.

Voltage 160 may be applied across emitter 110 and each of the plurality of collectors such that a potential difference is created. Voltage 160 may cause an electric field to form between emitter 110 and the plurality of collectors. Again, emitter 110 may emit an electron field at potential differences above approximately 1.5 V/µm. Thus, movement in two axis's may be determined analogously to movement determined in one axis as discussed with regard to FIG. 1.

Figure 4:
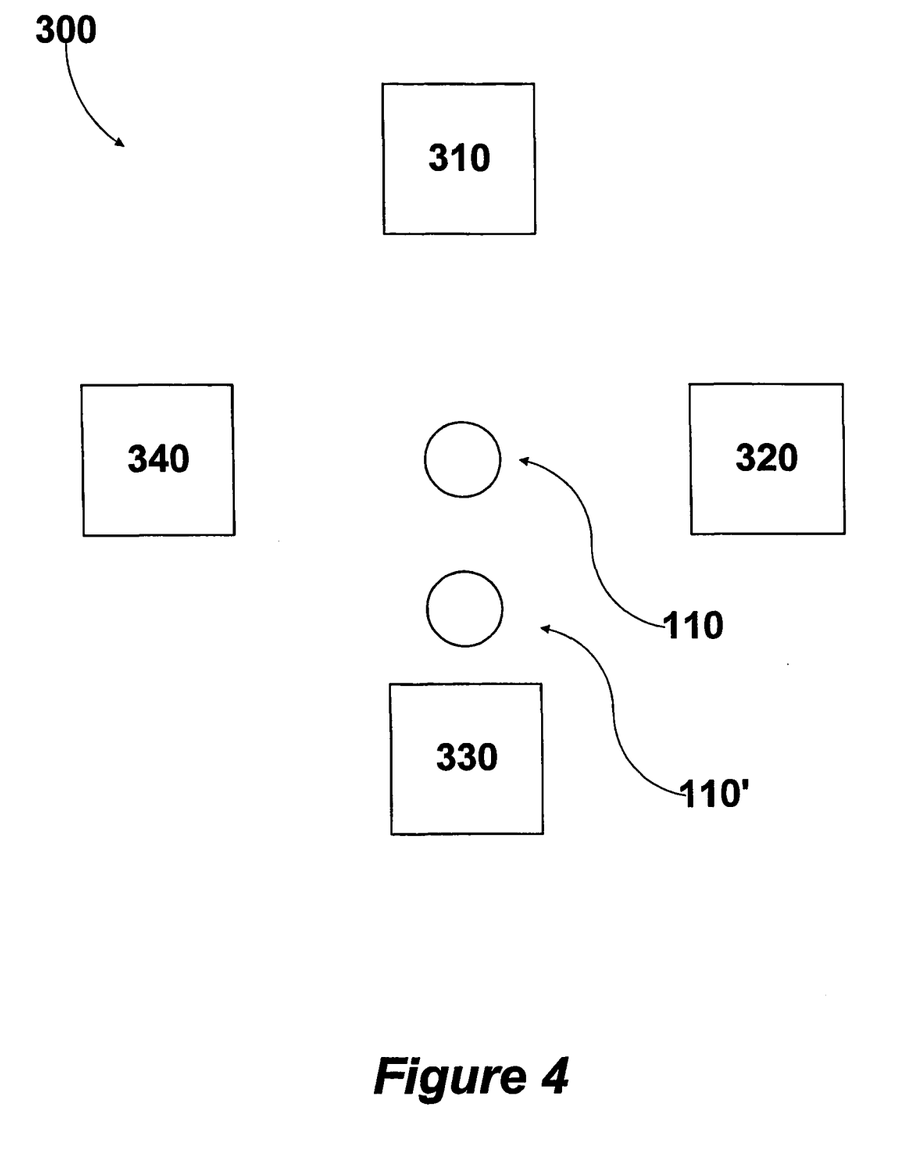
FIG. 4 illustrates a top view of the apparatus of FIG. 3.

Referring now also to FIG. 4, apparatus 300 may be seen from a top view. As may be seen in FIGS. 3 and 4, in the absence of, or substantially in the absence of, forces acting on emitter 110, the free tip of emitter 110 may be located near a center of the plurality of collectors such that it is equidistant, or substantially equidistant, from each of the collectors 310, 320, 330, 340. In this configuration, each of the plurality of collectors may receive approximately equivalent electron flux from emitter 110. However, as emitter 110 reacts to force, such as by bending or deflecting in a cantilevered fashion, the free tip of emitter 110 may be displaced by accelerative force from the equidistant, at rest position, thereby placing the free tip of emitter 110 (shown in FIG. 4 as 110') closer to at least one of the plurality of collectors, in the illustrated case collector 330. The collector in closest proximity to emitter 110 may have an increase in the electron flux as compared to the at-rest state and the other collectors. Assuming a constant, or substantially constant, applied voltage across emitter 110 and the plurally of collectors, a decrease in separation distance may strengthen the electric field causing the field emission, and conversely if the separation distance increases, the electric field may decrease.

By measuring the electron flux in the form of electrical current, or another suitable measurement technique, from each collector included in the plurality of collectors, and comparing these individual currents to each other, the position of the free tip of emitter 110 relative to each of plurality of collectors may be deduced by methods known to those possessing an ordinary skill in the pertinent arts. From the position of the free tip of emitter 110 relative to each of plurality of collectors and knowledge of the physical characteristics of the apparatus 300, such as the stiffness and proof mass of emitter 110, the force experienced by emitter 110 may be calculated, thereby concluding the applied force due to acceleration for example.

The sensitivity of an apparatus according to an aspect of the present invention may be adjusted for forces ranging from small to large. For example, sensitivity of apparatus 300 may be adjusted by modifying the proof mass or stiffness of emitter 110, such that an increase in mass or decrease in stiffness may achieve sensitivity to lower force magnitudes and different frequency vibrations. Also, the distance between the plurality of collectors and the tip of emitter 110 may be adjusted.

As will be recognized by one possessing ordinary skill in the pertinent arts, and by way of non-limiting example only, operationally, apparatus 300 may be limited in sensitivity to relatively large forces, such as those larger than 10 times the force of gravity (10 g's), and may be well suited for sensitivity greater than 100 g's. Apparatus 300 may be resilient to large force inputs, and may therefore be a good sensor for very high force measurements without damaging emitter 110 or other components, such as, for example forces greater than 1,000 g's often found in the automotive and aerospace industries.

Figure 5:
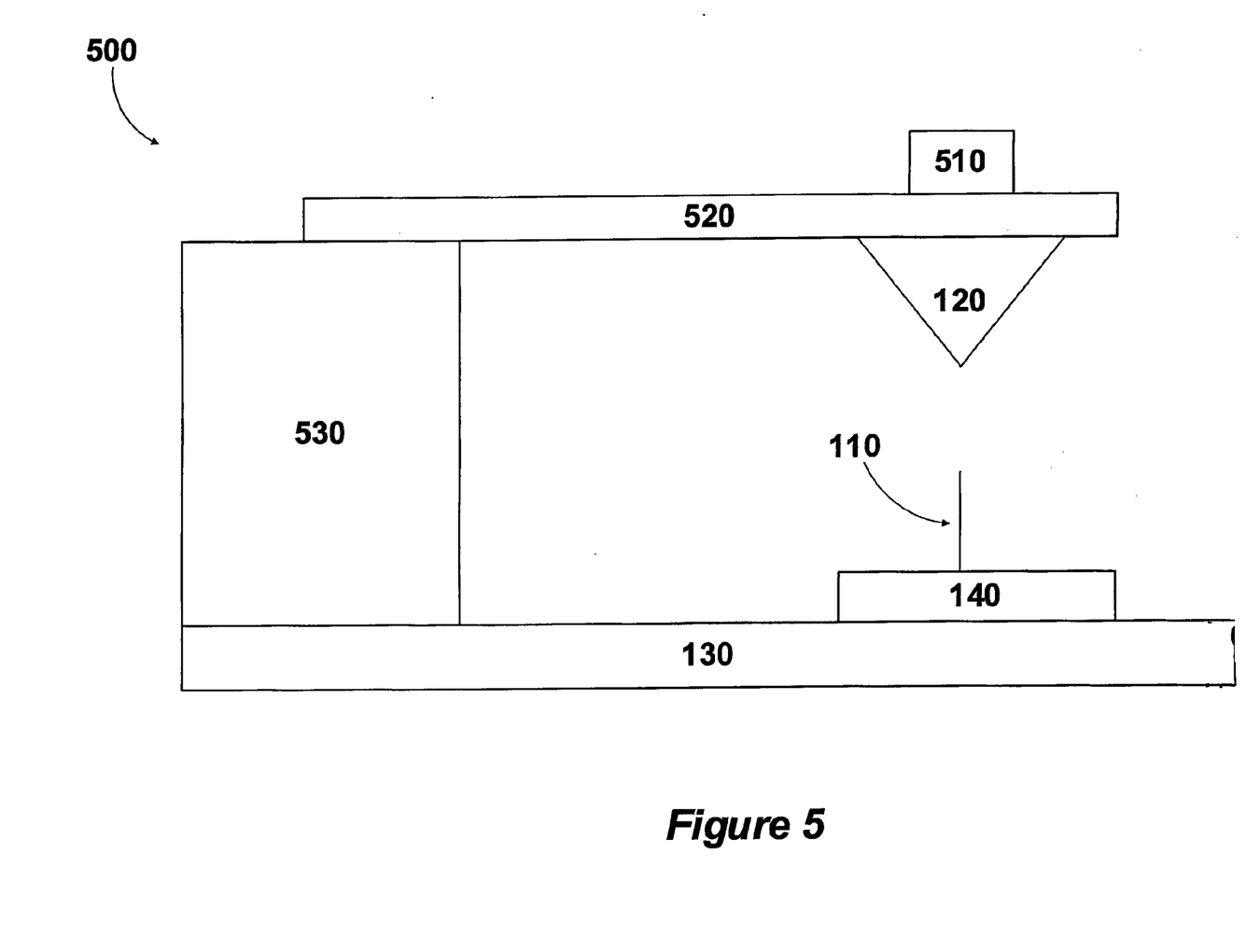
FIG. 5 illustrates a block diagrammatic representation of an apparatus according to an aspect of the present invention.

Referring now to FIG. 5, there is shown an apparatus 500 for sensing force according to an aspect of the present invention. As may be seen in FIG. 5, apparatus 500 includes proof mass 510, collector 120, beam 520, at least one support or insulating layer 530, substrate 130, emitter 110 and excitation collector 140. As discussed hereinabove, emitter 110 may be electrically coupled to excitation collector 140 and mechanically coupled to substrate 130, while a distal, free end of emitter 110 is free to move. Support or insulating layer 530 may also be attached to substrate 130. Beam 520 may be attached to support or insulating layer 530 distal to substrate 130 such that beam 520 may be supported on one end only, in a cantilevered configuration. Support 530 may be largely composed of materials used in standard micro-electromechanical sacrificial etch fabrication processes, such as Silicon, Silicon Dioxide or Silicon Nitride wherein this support may not be required to be electrically conductive, by way of non-limiting example only. Beam 520 may be largely composed of materials such as Silicon, Silicon Dioxide or Silicon Nitride with conductive material coatings or dopings such as phosphor, gold or copper, that can provide electrical conductivity as needed, by way of non-limiting example only. Proof mass 510 and collector 120 may be attached to beam 520, which connection may be located substantially opposite to support 530, as depicted in FIG. 5, for example. Cantilevered beam 520 and proof mass 510 to be designed for sensitivity to a relatively wide range of forces, such as relatively smaller forces as compared to those discussed with regard to FIGS. 3 and 4 (such as <10 g's). Proof mass 510 may be positioned at a predetermined point along beam 520 selected to achieve the desired force sensitivity and vibration response required.

Proof mass 510 may be within collector 120, collector 120 itself, or a separate material weighting beam 520. Further, beam 520 may be selectively doped. Further, a combination of these techniques may be used.

Beam 520 may deflect responsively to a force applied to apparatus 500 so as to either move collector 120 closer to or further from emitter 110. If collector 120 moves closer to emitter 110, the current associated with collector 120 may increase. If collector 120 moves further from emitter 110, the current associated with collector 120 may decrease. Collector 120 current may be converted to displacement and knowledge of the mass and mechanical properties of apparatus 500 allows further conversion to the force acting on apparatus 500 using conventional methodologies.

The at-rest position may be determined when no forces are acting on proof mass 510 and may be defined as a null, or no-forces applied, position. Various configurations exist for a null position. For example, the distance between collector 120 and emitter 110 may be set by design so that the field emission is in the cut off region 220 or at some midpoint between cutoff 220 and saturation regions 210, as is shown in FIG. 2. As set forth, in cutoff region 220 there may be insufficient electric field potential to cause emitter 110 to emit electrons, while in saturation region 210 there may be no appreciable increase in the current even with increased electric field potential. In the case where the null force point is set midway between cutoff 220 and saturation 210, increasing or decreasing current measurements in collector 120 current measurement circuit may be used to detect forces along both directions in one axis using a single beam sensor. If the set point is in cutoff region 220, apparatus 500 may be sensitive to forces in one direction along one axis because monitoring is for only an increase in collector 120 current. Thus, in the case where the null point is set for the field emission cutoff mode 220, a set of two apparatus 500, or collectors 120 oriented so as to detect both force directions would be necessary for a single axis force sensor.

Further, while a single axis force sensor may be realized with the apparatus shown in FIG. 5. Multiple devices may be located in each of three orthogonal axes to sense three-dimensional forces, for example.

Figure 6:
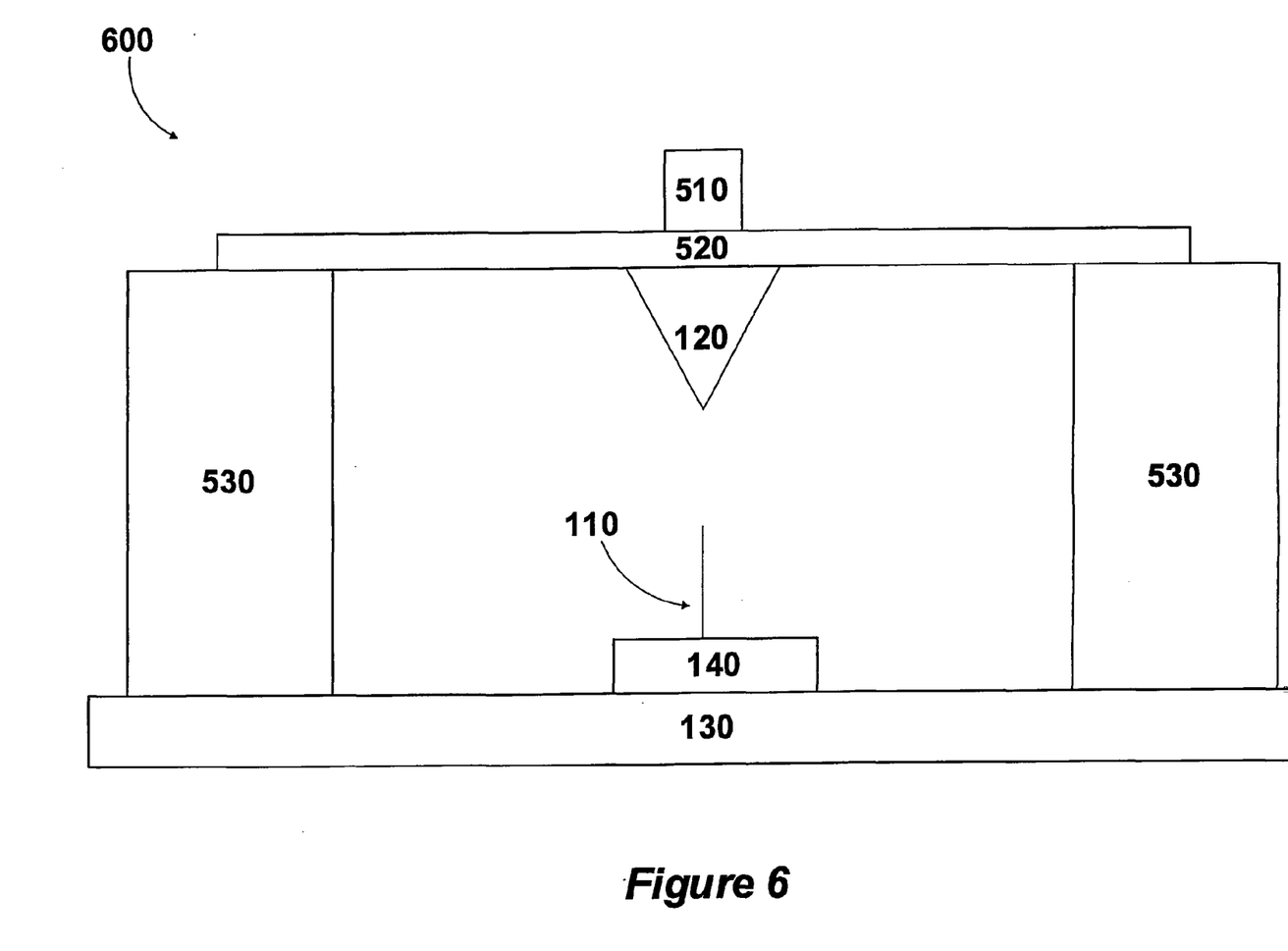
FIG. 6 illustrates a block diagrammatic representation of an apparatus according to an aspect of the present invention; and, FIG. 7 illustrates a block diagrammatic representation of an apparatus according to an aspect of the present invention.

Referring now to FIG. 6, there is shown an apparatus 600 for sensing force according to an aspect of the present invention. As may be seen in FIG. 5, apparatus 500 includes proof mass 510, collector 120, beam 520, support or insulating layer 530, substrate 130, emitter 110 and excitation collector 140. As discussed hereinabove, emitter 110 may be electrically coupled to excitation collector 140 and mechanically coupled to substrate 130, while a distal, free end of emitter 110 is free to move. Support or insulating layer 530 may also be attached to substrate 130. Beam 520 may be attached to support or insulating layer 530 distal to substrate 130 such that beam 520 may be supported on multiple ends, such as by being fixedly coupled or simply supported. Support 530 may be largely composed of materials used in standard microelectromechanical sacrificial etch fabrication processes, such as Silicon, Silicon Dioxide or Silicon Nitride wherein this support may not be required to be electrically conductive, by way of non-limiting example only. Beam 520 may be largely composed of materials such as Silicon, Silicon Dioxide or Silicon Nitride with conductive material coatings or dopings such as phosphor, gold or copper, that can provide electrical conductivity as needed, by way of non-limiting example only. Proof mass 510 and collector 120 may be attached to beam 520, which connection may be located between supporting portions of support 530, as depicted in FIG. 6, for example. Beam 520 and proof mass 510 to be designed for sensitivity to a relatively wide range of forces, such as relatively smaller forces as compared to those discussed with regard to FIGS. 3 and 4 (such as <10 g's). Proof mass 510 may be positioned at a predetermined point along beam 520 selected to achieve the desired force sensitivity and vibration response required.

Proof mass 510 may be within collector 120, collector 120 itself, or a separate material weighting beam 520. Further, beam 520 may be selectively doped. Further, a combination of these techniques may be used.

Beam 520 may deflect responsively to a force applied to apparatus 500 so as to either move collector 120 closer to or further from emitter 110. If collector 120 moves closer to emitter 110, the current associated with collector 120 may increase. If collector 120 moves further from emitter 110, the current associated with collector 120 may decrease. Collector 120 current may be converted to displacement and knowledge of the mass and mechanical properties of apparatus 500 allows further conversion to the force acting on apparatus 500 using conventional methodologies.

The at-rest position may be determined when no forces are acting on proof mass 510 and may be defined as a null, or no-forces applied, position. Various configurations exist for a null position. For example, the distance between collector 120 and emitter 110 may be set by design so that the field emission is in the cut off region 220 or at some midpoint between cutoff 220 and saturation regions 210, as is shown in FIG. 2. As set forth, in cutoff region 220 there may be insufficient electric field potential to cause emitter 110 to emit electrons, while in saturation region 210 there may be no appreciable increase in the current even with increased electric field potential. In the case where the null force point is set midway between cutoff 220 and saturation 210, increasing or decreasing current measurements in a collector 120 current measurement circuit may be used to detect forces along both directions in one axis using a single beam sensor. If the set point is in cutoff region 220, apparatus 600 may be sensitive to forces in one direction along one axis because monitoring is for only an increase in collector 120 current. Thus, in the case where the null point is set for the field emission cutoff mode 220, a set of two apparatus 600 oriented so as to detect both force directions would be necessary for a single axis force sensor.

Figure 7:
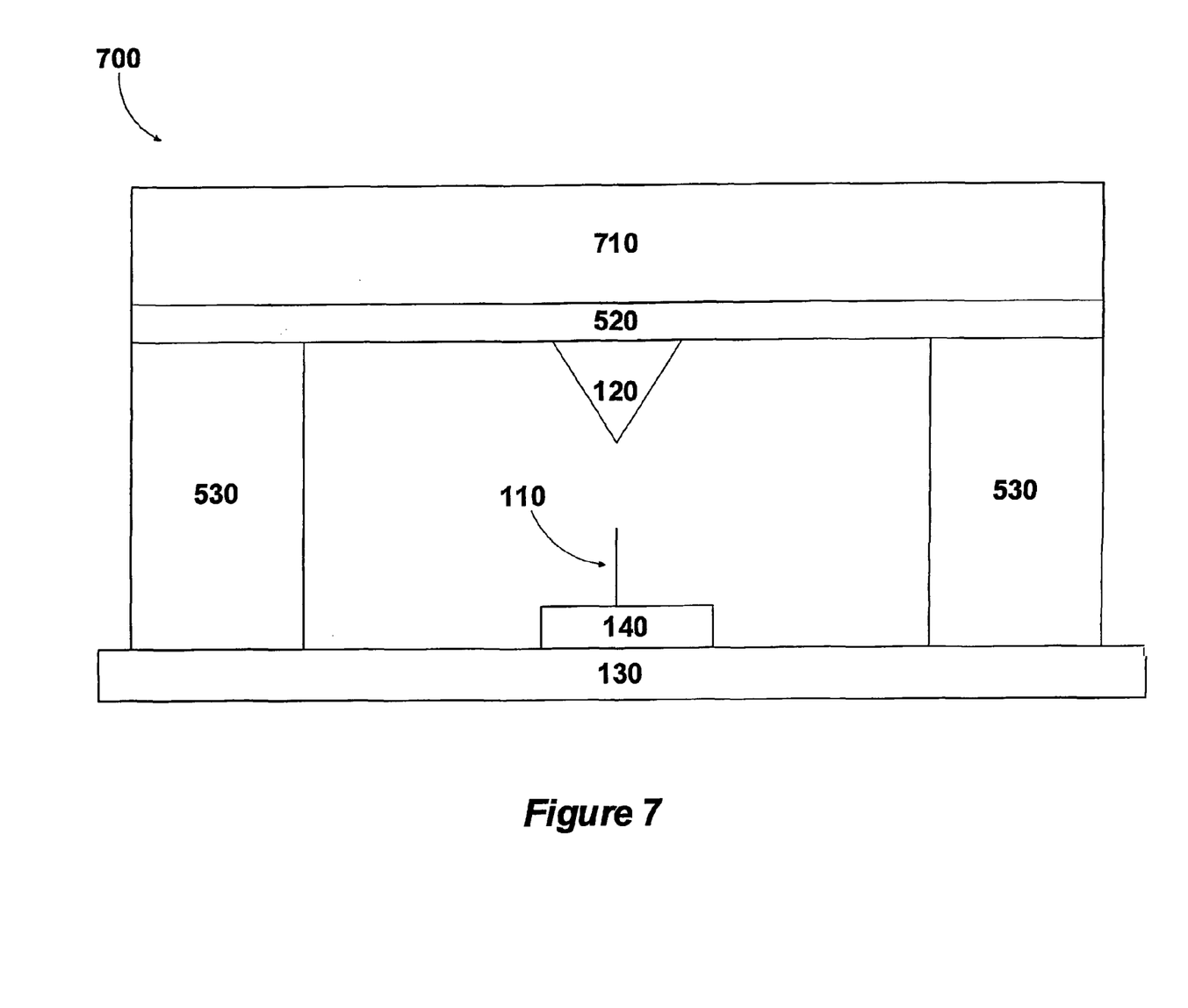

A single axis force sensor may be realized with the apparatus shown in FIG. 6. Multiple devices may be located in each of three orthogonal axes to sense three-dimensional forces, for example. Referring how to FIG. 7, there is shown an apparatus 700 for measuring fluid pressure according to an aspect of the present invention. Similar in design to apparatus 600 of FIG. 6, apparatus 700 includes a fluid or gas compartment 710, collector 120, flexible membrane 520, support or insulating layer 530, substrate 130, emitter 110 and excitation collector 140. As discussed herein above, emitter 110 may be electrically coupled to excitation collector 140 and mechanically coupled to substrate 130, while a distal, free end of emitter 110 is free to move. Support or insulating layer 530 may also be attached to substrate 130. Membrane 520 may be attached to support or insulating layer 530 distal to substrate 130 such that membrane 520 may be largely peripherally supported. Support 530 may be largely composed of materials used in standard micro-electromechanical sacrificial etch fabrication processes, such as Silicon, Silicon Dioxide or Silicon Nitride wherein this support may not be required to be electrically conductive, by way of non-limiting example only. Beam 520 may be largely composed of materials such as Silicon, Silicon Dioxide or Silicon Nitride with conductive material coatings or dopings such as phosphor, gold or copper, that can provide electrical conductivity as needed, by way of non-limiting example only. Further, beam 520 may be composed of a layer of thin membrane material that may be attached to the chip on top. Suitable film membranes may be made from materials such as polyamide or other thin flexible films, and may themselves be electrically patterned so as to provide electrodes and/or signal traces, for example.

Fluid or gas compartment 710 and collector 120 may be attached to flexible membrane 520, which connection may be located substantially symmetrically between plurality of supports 610, for example. Flexible membrane 520 may separate fluid or gas chamber 710 from apparatus 700. Fluid or gas chamber 710 may be any number of containers such as a tank, a pipe, cavity or channel for fluid or gas transport. Collector 120 may be positioned on flexible membrane 520 distal to fluid or gas compartment 710. If there is substantially no fluid pressure acting on flexible membrane 520, collector 120 may be sufficiently separated from the emitter 110 so as not to allow field emission, operating in the cutoff mode 220 as discussed herein above and shown in FIG. 2. As the fluid or gas pressure within compartment 710 increases however, flexible membrane 520 may be depressed, thereby protruding down and causing collector 120 to move closer to emitter 110 increasing the field emission from emitter 110 and producing a measurable current in a circuit attached to collector 120. The current seen in the collector 120 circuit is related to the fluid pressure. By measuring the current, a circuit or algorithm may compute the pressure and rate of change in pressure in the fluid or gas chamber 710.

In summary, the present invention makes use of the field emission characteristics of carbon nanotubes to both sense and measure force. The present invention may employ carbon nanotubes as emitters taking advantage of the emission properties of carbon nanotubes so as to allow a larger gap and more sensitive force measurements. The present invention may utilize a gap between emitter and collector measured in at least nanometers and even as large as micrometers. Use of the present invention may improve performance because vibrating beam material may be used providing more flexibility and allowing the apparatus to be more sensitive to smaller forces and wider frequency vibrations. Using field emission characteristics of such an emitter, particularly carbon nanotubes, may allow the change in gap to be derived from a change in electron flux between emitter and collector that is related to a change in current measured in a circuit connected to collector. Carbon nanotubes are excellent field emitters because their diameter is much smaller than conventional emitter structures, thus providing a sharp point to achieve field emission from. In addition, being very small, many nanotubes can be arranged together to increase the total emission output. Consequently, nanotubes can yield potentially higher emission current levels per unit area. Higher current levels are easier to measure in external circuits and can yield better signal to noise ratios producing better measurement sensitivity which, for the present invention, translates to better sensitivity and accuracy in measurement of forces acting on the sensor. That is, using carbon nanotubes as emitters may allow a relatively wide gap between emitter and collector so as to allow larger beam displacement and achieve wider force measurement and vibration frequency sensitivity. Additionally, larger collector currents may be realized providing more signal sensitivity and better signal to noise ratio.

According to an aspect of the present invention, there may be provided field emission based sensor devices for relating force to field emission current output, wherein carbon nanotubes, or other similar conductive nanofibers or nanostructures, may serve as an emission source. Further, such devices may employ carbon nanotubes or similarly sharp nanostructures to provide a source for high current emission for the purpose of allowing high working current levels per unit area so as to provide for improved sensitivity and range of force measurements.

It is to be understood that the figures and descriptions of the present invention have been simplified to illustrate elements that are relevant for a clear understanding of the present invention, while eliminating, for the purpose of clarity, many other elements found in typical accelerometers and methods of manufacturing and using the same. Those of ordinary skill in the art will recognize that other elements and/or steps are desirable in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art. Thus, it is intended that the present invention covers the modifications and variations of this invention provided they come within the scope of the appended claims and their equivalents.

What is claimed:

1. An apparatus for sensing at least one force applied to the apparatus, said apparatus comprising:
   at least one carbon-based nanostructure being suitable for emitting electrons, where at least one dimension of the entire nanostructure is in the nano range; and
   at least one collector proximately positioned with respect to said at least one nanostructure so as to receive said emitted electrons and define at least one gap therebetween that is at least partially dependent upon said applied force;
   wherein, said emission and reception of said electrons is indicative of said applied force.

2. The apparatus of claim 1, further comprising:
   means for applying at least one electrical potential across said gap.

3. The apparatus of claim 1;
   wherein said at least one nanostructure and at least one collector are adapted to have at least one electrical potential applied there-across.

4. The apparatus of claim 3;
   wherein said at least one nanostructure and collector are operable in a first mode corresponding to a cutoff region for emissions and a second mode corresponding to substantially potential and gap dependent emissions.

5. The apparatus of claim 4;
wherein said electrical potential is adapted to operate said at least one nanostructure in at least one of said modes in a first state and at least one other of said modes in response to said applied force.

6. The apparatus of claim 4;
wherein said at least one nanostructure and collector are operable in a third mode corresponding to a saturation region for emissions.

7. The apparatus of claim 1;
wherein said at least one nanostructure comprises one or more carbon nanotubes suitable for emitting an electron field when electrically excited.

8. The apparatus of claim 1;
wherein said at least one nanostructure comprises at least one film suitable for emitting an electron field when electrically excited and comprising one or more carbon nanotubes.

9. The apparatus of claim 1;
wherein said at least one nanostructure comprises at least one self aligned carbon nanotube.

10. The apparatus of claim 1;
wherein said at least one nanostructure comprises at least one array of self aligned carbon nanotubes.

11. The apparatus of claim 1;
wherein at least a portion of said at least one nanostructure is adapted to be displaced in response to said applied force.

12. The apparatus of claim 1;
wherein said at least one nanostructure provides a proof mass for sensing said applied force.

13. The apparatus of claim 12;
wherein said at least one nanostructure is adapted to provide said proof mass.

14. The apparatus of claim 13, further comprising:
a predetermined mass affixed to said at least one nanostructure.

15. The apparatus of claim 13;
wherein a mass of said at least one nanostructure is increased by molecular absorption of at least one substance to provide said proof mass.

16. The apparatus of claim 15;
wherein said at least one nanostructure further comprises hydrogen.

17. The apparatus of claim 1, further comprising:
at least one current sensor electrically coupled to said at least one collector and for detecting at least one current being indicative of said emission and collection.

18. The apparatus of claim 1, further comprising:
a plurality of collectors each being proximately positioned with respect to said at least one nanostructure so as to receive said emitted electrons and define at least one corresponding gap therebetween that is at least partially dependent upon said applied force.

19. The apparatus of claim 1, further comprising:
at least one current sensor electrically coupled to each said collector and for detecting at least one current being indicative of said emission and collection.

20. The apparatus of claim 1;
wherein said at least one collector detects said emissions using thermal detection.

21. The apparatus of claim 1;
wherein said at least one collector detects said emissions using spectral re-emission of energy, wherein said spectral re-emission is at least partially dependent upon an energy associated with electrons impacting said collector.

22. The apparatus of claim 1;
wherein the gap is configured such that there is substantially no field emission in an absence of said applied force.

23. The apparatus of claim 1, further comprising:
means for applying at least one electrical potential across said gap; and,
means for measuring an electron current being indicative of said applied force between said at least one collector and said means for applying at least one electrical potential across said gap.

24. The apparatus of claim 23;
wherein said at least one electrical potential across said gap is substantially constant.

25. The apparatus of claim 1;
wherein at least said at least one nanostructure and collector are in a substantial vacuum chamber.

26. The apparatus of claim 1, further comprising:
a deflectable member supporting said at least one collector, wherein said gap is at least partially dependent upon deflection of said deflectable beam.

27. The apparatus of claim 26, further comprising:
at least one support physically coupling said at least one nanostructure to said at least one collector.

28. The apparatus of claim 27, further comprising:
a proof mass mechanically coupled to said member.

29. The apparatus of claim 28;
wherein said member is mechanically coupled to said at least one support in a cantilevered manner.

30. The apparatus of claim 28;
wherein said member is simply supported by said at least one support.

31. The apparatus of claim 28;
wherein said member is fixedly coupled to said at least one support.

32. The apparatus of claim 26;
wherein said member comprises at least one beam.

33. The apparatus of claim 26;
wherein said at least one member comprises at least one deflectable membrane.

34. The apparatus of claim 33;
wherein said membrane is suitable for deflecting in response to a pressure applied thereto.

35. The apparatus of claim 34;
wherein said applied force corresponds to said applied pressure.

36. The apparatus of claim 35, further comprising:
a compartment containing at least one of a fluid and a gas exerting said pressure.

37. The apparatus of claim 36;
wherein said compartment form at least a portion of a tank, pipe, cavity or channel for fluid or gas transport.

38. A method for sensing at least one applied force, said method comprising:
receiving emissions from at least one carbon-based nanostructure using at least one collector proximately positioned with respect to said at least one nanostructure, where at least one dimension of the entire nanostructure is in the nano range; and
sensing at least one current associated with said at least one collector;
wherein, said sensed current is indicative of said applied force.

39. The method of claim 38, further comprising:
the step of applying at least one electrical potential across a gap between said at least one collector and at least one nanostructure.

40. The method of claim 38, further comprising:
the step of applying at least one electrical potential across said at least one nanostructure and collector.

41. The method of claim 40;
wherein said at least one nanostructure and collector are operable in a first mode corresponding to a cutoff region for emissions and a second mode corresponding to substantially potential and gap dependent emissions.

42. The method of claim 41;
wherein said electrical potential is adapted to operate said at least one nanostructure in at least one of said modes in a first state and at least one other of said modes in response to said applied force.

43. The method of claim 41;
wherein said at least one nanostructure and collector are operable in a third mode corresponding to a saturation region for emissions.

44. The method of claim 38;
wherein said at least one nanostructure comprises one or more carbon nanotubes suitable for emitting an electron field when electrically excited.

45. The method of claim 38;
wherein said at least one nanostructure comprises at least one film suitable for emitting an electron field when electrically excited and comprising one or more carbon nanotubes.

46. The method of claim 38;
wherein said at least one nanostructure comprises at least one self aligned carbon nanotube.

47. The method of claim 38;
wherein said at least one nanostructure comprises at least one array of self aligned carbon nanotubes.

48. The method of claim 38;
wherein at least a portion of said at least one nanostructure is adapted to be displaced in response to said applied force.

49. The method of claim 38;
wherein said at least one nanostructure provides a proof mass for sensing said applied force.

50. The method of claim 38;
wherein said at least one nanostructure is adapted to provide said proof mass.

51. The method of claim 39;
wherein the gap is configured such that there is substantially no field emission in an absence of said applied force.

52. The method of claim 39, further comprising:
the step of applying at least one substantially constant electrical potential across said gap.

53. The method of claim 38;
wherein said applied force takes the form of a pressure deflecting at least one membrane at least partially supporting said at least one collector.

54. The method of claim 38, further comprising:
the step of sensing a plurality of currents associated with a plurality of collectors each being proximately positioned with respect to said at least one nanostructure.

55. An accelerometer comprising:
at least one carbon-based nanostructure being suitable for emitting electrons in response to application of at least one potential, where at least one dimension of the entire nanostructure is in the nano range; and
a collector positioned with respect to said at least one nanostructure to sense said emitted electrons upon application of said potential;
wherein, said at least one nanostructure is sufficiently and at least partially displaceable with respect to said collector such that displacement of said at least one nanostructure with respect to said collector is indicative of at least one acceleration.

56. The accelerometer of claim 55, further comprising:
means for applying said potential between said at least one nanostructure and collector.

57. The accelerometer of claim 55;
wherein said at least one nanostructure and collector are operable in a first mode corresponding to a cutoff region for emissions and a second mode corresponding to substantially displacement dependent emissions.

58. The accelerometer of claim 57;
wherein said potential is suitable for operate said at least one nanostructure in at least one of said modes in a first state and at least one other of said modes in response to said applied force.

59. The accelerometer of claim 58;
wherein said at least one nanostructure comprises one or more carbon nanotubes suitable for emitting an electron field when electrically excited.

60. The accelerometer of claim 55;
wherein said at least one nanostructure comprises at least one film suitable for emitting an electron field when electrically excited and comprising one or more carbon nanotubes.

61. The accelerometer of claim 55;
wherein said at least one nanostructure comprises at least one carbon nanotube having ends affixed to at least one substrate.

62. The accelerometer of claim 55;
wherein said at least one nanostructure comprises at least one array of self aligned carbon nanotubes.

63. The accelerometer of claim 55;
wherein said at least one nanostructure provides a proof mass.

64. The accelerometer of claim 55;
further comprising a predetermined mass affixed to said at least one nanostructure.

65. The accelerometer of claim 55;
wherein a mass of said at least one nanostructure is at least partially dependent upon at least one molecularly absorbed substance.

66. The accelerometer of claim 55;
wherein said at least one nanostructure further comprises hydrogen.

67. The accelerometer of claim 55, further comprising:
at least one current sensor electrically coupled to said at least one collector and being suitable for detecting at least one current being indicative of said emission and collection.

68. The accelerometer of claim 55;
wherein said at least one collector comprises a plurality of collectors each being proximately positioned with respect to said at least one nanostructure so as to receive said emitted electrons and define at least one corresponding gap there between that is at least partially dependent upon said applied force.

69. A field emission based sensing device comprising:
a plurality of carbon-based nanostructures, where at least one dimension of each entire nanostructure is in the nano range; and
at least one sensor proximately positioned with respect to said nanostructures and being suitable for receiving field emissions from said nanostructures based upon application of a bias across said sensor and nanostructures and at least partial displacement of said nanostructures with respect to said sensor.

70. The field emission based sensory device of claim 69, further comprising:
   at least one excitation pad electrically coupled to at least over of said plurality of nanostructures.

71. The field emission based sensory device of claim 69; wherein said at least one sensor comprises a plurality of sensors.

72. The field emission based sensory device of claim 71; wherein each of said sensors comprises at lease one collector.

* * * * *